J. V. ROBINSON.
AUTOMATIC TRAIN PIPE CONNECTOR.
APPLICATION FILED MAR. 12, 1914. RENEWED SEPT. 13, 1917.
1,245,789.
Patented Nov. 6, 1917.
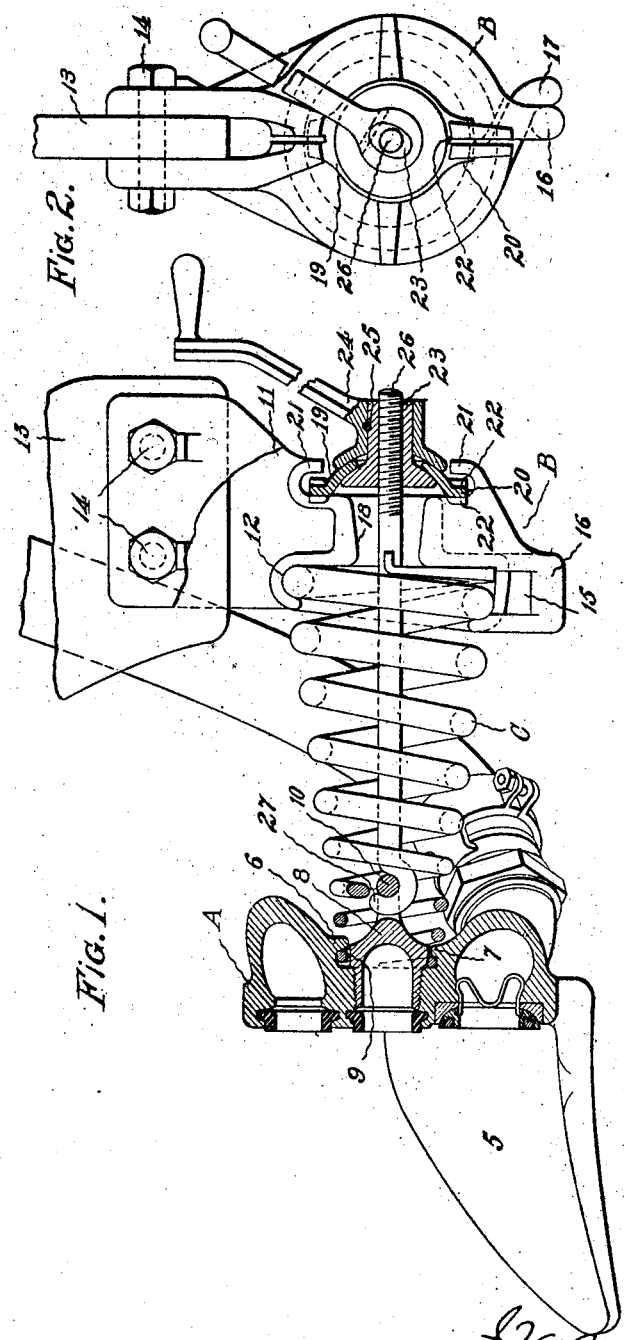

UNITED STATES PATENT OFFICE.

JOSEPH V. ROBINSON, OF BRANFORD, CONNECTICUT.

AUTOMATIC TRAIN-PIPE CONNECTOR.

1,245,789. Specification of Letters Patent. Patented Nov. 6, 1917.

Original application filed June 10, 1912, Serial No. 702,817. Divided and this application filed March 12, 1914, Serial No. 824,295. Renewed September 13, 1917. Serial No. 191,310.

*To all whom it may concern:*

Be it known that I, JOSEPH V. ROBINSON, a citizen of the United States, and resident of Branford, county of New Haven, State of Conn., have invented certain new and useful Improvements in Automatic Train-Pipe Connectors, of which the following is a specification.

This is a division of my application for United States Letters Patent Filed June 10, 1912, Serial Number 702,817, for improvements in automatic train pipe connectors, and the invention herein described has for its object to provide an improved means of renewing defective gaskets between the faces of coupled connectors without first separating the cars.

In carrying out this object I provide a construction by which the connector head may be shifted into, as well as out of, engagement independent of movement of the supporting base.

To this end the invention consists in the combinations, improvements and arrangements hereinafter described, pointed out in the appended claims, and illustrated in the accompanying drawings, in which:

Figure 1 is a side view of my improvement showing some of the parts in section, and Fig. 2, is a rear view thereof.

Referring to the drawings: My improvement may be used with any satisfactory form of connector head A and with any suitable support B for suspending the connector from the car. I show a coupling head of substantially oval outline viewed from the front and having guiding prongs 5 diagonally spaced upon its face for alining the head with an opposing head in coupling under conditions of disalinement.

To permit the oscillatory movement of the head required in service, I mount the latter upon the apex end of a conical supporting spring C, said apex end being seated in a transverse recess of diametrically disposed portions 6 and 7 on the rear face of the head. To lock the same in the recess I provide a plug 8, threadingly connected to the head and lying within the apex coils of the spring and between the portions 6 and 7. The plug is provided with a tapered shoulder 9 for expanding the coils of the spring into tight engagement with the said recessed portions and has also an eye 10.

The base of the supporting spring C may be secured to the bracket B in any suitable manner. For this purpose I have shown a bracket comprising halves 11, each having on its inner face a semi-circumferential recess 12 in which the base of the spring rests. The halves are secured together about the spring and clamped to a lug 13 of the car by bolts 14, in coöperation with a hinge connection 15 which connection comprises a perforated ear 16 on one member and a curved finger 17 on the other member for engagement with the ear, as shown.

The bracket is provided with a lateral opening 18 within which operates my improved means for renewing defective gaskets without uncoupling the cars. Such means comprises a flaring head 19 of segmental or spherical cross-section having a concave inner face and provided with diametrically opposite ears 20 adapted to be inserted between the bracket halves 11 and lugs 21, projecting from said halves for confining the head 19 against axial shifting; said ears 20 being provided with projections 22 adapted to extend between the respective bracket halves 11 and lugs 21 to constitute stops for locking said head 19 against rotation. A nut 23 and a handle 24 are secured together as by a pin 25, in rotatable engagement with the opposite sides of said head 19, the spherical contour of the head 19 and the concave conformation of its inner face permitting universal swing of said nut thereon.

A rod 26 is threaded through said nut 23 and provided at its forward end with suitable means for engaging the connector head. I have shown for this purpose a hook 27 on the forward end of the rod 26 for engaging the eye 10 of the plug 8. This provides a simple and efficient construction by which the head 19 carrying the nut 23 and handle 24 can be readily inserted in position on the bracket B for withdrawing a connector head A from coupled engagement against the tension of its supporting spring C. The hook 27 permits the withdrawn head to be readily turned to position for convenient inspection and repair of its coupling face and gasket.

The parts 19, 23, 24 and 25 may be termed a wrench adapted to be interchangeably used with all the automatic connectors of a train to effect renewal of defective gaskets without first uncoupling the cars as it is a means so used for that purpose. With such a construction, the head A may also be shifted into engagement, as well as out of engagement. In forcing the head into engagement, the ears 20 of the head 19 engage the rear face of the lugs 21 on the bracket, when continued rotation of the nut 23 to the left will force the connector head forwardly into proper coupled engagement.

By inserting the wrench 24 and drawing up on it until it properly engages the bracket B, the tension of the supporting spring C of coupled connectors, may be confined between the head and bracket B and the bolts 14 removed and the connector as a whole taken off the car without uncoupling the cars.

Having thus described my invention, what I claim as new and desire to secure by United States Letters Patent is:

1. In an automatic train pipe connector provided with a head, the combination of a bracket, a spring supporting said head on said bracket, and removable power mechanism adapted to be supported on said bracket for shifting said connector head against the tension of said supporting spring in all coupled positions of said head.

2. In an automatic train pipe connector provided with a head, the combination of a bracket, a spring on said bracket for supporting said head, and removable power mechanism adapted to be supported in engagement with said bracket for shifting said connector head from and into coupled engagement with the coöperating head of an adjacent car in a train independent of movement of said bracket.

3. In an automatic train pipe connector provided with a head, the combination of a bracket, a spring supporting said head on said bracket, means extending through said bracket for detachably engaging a member on said head, and removable mechanism adapted to be supported on said bracket in actuating engagement with said means for shifting said head against the tension of said spring.

4. In an automatic train pipe connector provided with a head, the combination of a bracket, a spring connecting the bracket and head and constituting the sole support for the head, a member connected with the head and extending through said bracket, and means for engaging said member to shift said head relative to the bracket.

5. In an automatic train pipe connector, the combination of a head, a bracket carrying a yieldable support for supporting said head, a stem extending rearwardly of the head and through said bracket, and a wrench removably mounted on said stem and bearing against said bracket for shifting said head independent of movement of the bracket.

6. In an automatic train pipe connector, the combination of a head, a bracket carrying a yieldable support for supporting said head, a stem extending rearwardly of the head past said bracket, and a wrench removably mounted on said stem and having a threaded portion, said portion being mounted in a partly spherical concave seat for oscillatory movement therewith relative to said bracket.

7. In an automatic train pipe connector, the combination of a head, a bracket carrying a spring for supporting said head, a stem extending rearwardly of the head past said bracket, and means removably mounted on said stem for confining the resistance of said spring between said head and bracket when in the coupled position.

8. The herein described means, for use in shifting the head of an automatic train pipe connector against the tension of a spring acting to hold said head in coupling position, comprising a rod adapted to be supported on the hanger or supporting bracket for the connector and to engage the connector head, and means for moving said rod longitudinally.

9. A device for the purpose described comprising means adapted to be readily attached to or removed from the hanger or supporting bracket of an automatic train pipe connector and to detachably engage the head of the connector, and a crank connected with and adapted to positively move said means and head toward the bracket.

10. A device for the purpose described comprising a rod having at one end means for engaging the head of an automatic train pipe connector, a support for said rod adapted to be readily attached to or removed from the supporting bracket or hanger of the connector, and means engaging the rod and adapted to move the same longitudinally.

In testimony whereof I have hereunto set my hand in the presence of two witnesses.

JOSEPH V. ROBINSON.

Witnesses:
ARTHUR L. BRYANT,
S. C. MCBRIDE.